Jan. 30, 1973  TETSUYA OHRUI ET AL  3,714,333
METHOD FOR PRODUCING CONCENTRATED NITRIC ACID
Filed May 18, 1971
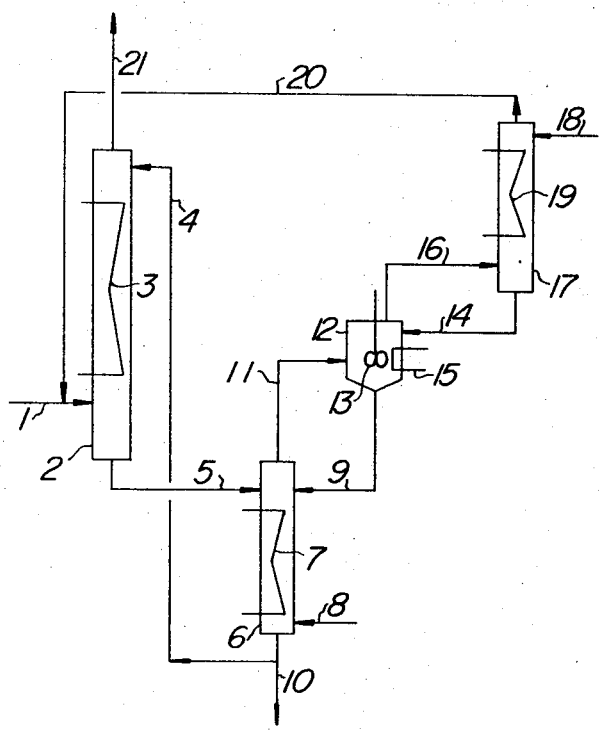
INVENTORS
**TETSUYA OHRUI
YASUHITO SAKAKIBARA
JUNJI TANAKA**
BY
ATTORNEYS United States Patent Office 3,714,333
Patented Jan. 30, 1973

3,714,333
METHOD FOR PRODUCING CONCENTRATED NITRIC ACID
Tetsuya Ohrui, Niihama-shi, Yasuhito Sakakibara, Saijo-shi, and Junji Tanaka, Niihama-shi, Japan, assignors to Sumitomo Chemical Company, Limited. Osaka, Japan
Filed May 18, 1971, Ser. No. 144,572
Claims priority, application Japan, May 27, 1970, 45/45,922
Int. Cl. C01b 21/40
U.S. Cl. 423—392        7 Claims

ABSTRACT OF THE DISCLOSURE

A process for efficiently producing concentrated nitric acid which comprises the steps of (1) absorption of nitrogen peroxide, (2) stripping of nitrogen peroxide, (3) synthesis of concentrated nitric acid from dilute nitric acid, nitrogen peroxide and air, and (4) washing of exhaust gas, characterized in that the 80-90 weight percent concentrated nitric acid obtained in the nitric acid synthesis step is used as an absorbent for nitrogen peroxide; nitrogen peroxide in the fuming nitric acid obtained in the nitrogen peroxide absorption step and the concentrated nitric acid obtained in the nitric acid synthesis step is stripped from concentrated nitric acid with the feed air; the stripped nitrogen peroxide is charged to the nitric acid synthesis step together with the feed air; unreacted nitrogen peroxide contained in the exhaust gas from the nitric acid synthesis step is absorbed in the feed dilute nitric acid and is then recycled to the nitric acid synthesis step; and unabsorbed gas in the exhaust gas washing step is recycled to the nitrogen peroxide absorption step.

---

The present invention relates to a novel process for producing concentrated nitric acid.

In general, nitric acid ($HNO_3$) is produced by converting nitrogen monoxide (NO) obtained by the oxidation of ammonia ($NH_3$) with air into nitrogen peroxide (an equilibrium mixture of $NO_2$ and $N_2O_4$— hereinafter referred to simply as "$N_2O_4$") and reacting the thus obtained nitrogen peroxide with water ($H_2O$). However, it is difficult to obtain nitric acid of a concentration higher than the azeotropic composition owing to low partial pressure of $N_2O_4$.

As is well known, in $HNO_3$-$H_2O$ system, an azeotrope is formed at 68 percent by weight of $NHO_3$. It is therefore impossible to concentrate a dilute nitric acid having a concentration lower than the azeotropic composition to concentrated nitric acid by a simple distillation operation.

Various processes for the production of concentrated nitric acid have heretofore been proposed. For example, extraction distillation process using a dehydrating agent such as concentrated sulfuric acid or magnesium nitrate and direct synthesis process wherein nitric acid of 98% by weight concentration is produced from oxygen ($O_2$), dilute nitric acid and liquid $N_2O_4$ by one step under a high pressure have been carried out on a commercial scale.

However, the above-mentioned processes have not necessarily been satisfactory in that auxiliary materials such as concentrated sulfuric acid and oxygen are required and consumption of utilities such as steam and electric power is large.

It is therefore the principal object of the present invention to avoid the difficulties heretofore encountered in the prior art processes for the production of concentrated nitric acid.

It is a further object to provide a process for the synthesis of concentrated nitric acid wherein no auxiliary materials are required and consumption of utilities is small.

Another object of the present invention is to provide a process for rationally producing concentrated nitric acid having a concentration of 80% by weight or more from nitrogen peroxide, dilute nitric acid and air at a low cost.

These and other objects and advantages of the invention will appear from the following description of the invention.

More particularly, a process for the production of concentrated nitric acid according to the present invention consists of steps of:

(1) Absorption of $N_2O_4$ into concentrated nitric acid
(2) Stripping of $N_2O_4$ with air from concentrated nitric acid containing nitrogen peroxide
(3) Synthesis of concentrated nitric acid from dilute nitric acid, $N_2O_4$ and air, and
(4) Washing of exhaust gas.

The process of the present invention is characterized in that the concentrated nitric acid of 80-90% by weight obtained in the nitric acid synthesis step is used as an absorbent for $N_2O_4$; $N_2O_4$ contained in the fuming nitric acid (concentrated nitric acid containing $N_2O_4$) obtained in the $N_2O_4$ absorption step and the concentrated nitric acid obtained in the nitric acid synthesis step is stripped with air, which is introduced as a starting material, and the stripped $N_2O_4$ is supplied to the nitric acid synthesis step together with the air; unreacted $N_2O_4$ contained in the exhaust gas from the nitric acid synthesis step is absorbed in the feed dilute nitric acid in the exhaust gas washing step and is recycled to the nitric acid synthesis step together with the dilute nitric acid; unabsorbed gas in the exhaust gas washing step is circulated to the $N_2O_4$ absorption step; and these steps and apparatuses are operated at substantially the same pressure.

Referring now to the drawing attached hereto, there is presented a process flowsheet illustrating one embodiment of the present invention.

In the drawing, it will be noted that a gas containing nitrogen oxides such as NO and $NO_2$ is mixed with the unabsorbed gas from an exhaust gas scrubber 17 which is supplied through a conduit 20 and the mixture is then introduced to a $N_2O_4$ absorption tower 2 through a conduit 1. Here, NO contained in the nitrogen peroxide-containing gas is oxidized into $N_2O_4$ with oxygen contained in the unabsorbed gas from the exhaust gas scrubber. Said $N_2O_4$ absorption tower 2 is a stainless steel tower having perforated plates and a cooling coil 3. The concentrated nitric acid of 80-90% by weight concentration is charged into the tower 2 at its top through a conduit 4 and is directly contacted with the nitrogen peroxide-containing gas to absorb $N_2O_4$.

The concentration of $N_2O_4$ absorbed in the concentrated nitric acid and the absorption efficency of $N_2O_4$ depend upon the number of plates in the absorption tower and the operating conditions, and are 10-30% by weight and 95-98%, respectively, at a pressure of 3 to 10 atmospheres and a temperature of —20° to 50° C. It is generally preferable to use the gas produced by oxidizing ammonia with air as said nitrogen peroxide-containing gas.

The nitric acid of a 80-90% by weight concentration containing dissolved $N_2O_4$ is then led to a $N_2O_4$ stripping tower 6 at its top through a conduit 5. The synthesized concentrated nitric acid as mentioned below is simultaneously charged to the top of the tower 6 through a conduit 9. The $N_2O_4$ stripping tower 6 is a tower which contains perforated plates and a heating coil 7. In the tower 6, the feed air supplied to the tower at its bottom through a conduit 8 is contacted with the above-mentioned $N_2O_4$-containing nitric acid ot strip off $N_2O_4$.

The stripping of $N_2O_4$ in the tower 6 is usually operated at a pressure of 3 to 10 atmospheres and at a temperature of 30° to 100° C.

Thus, the 99% or more of $N_2O_4$ dissolved in nitric acid is stripped off in this procedure.

The feed air is led to a nitric acid synthesis reactor 12 together with the stripped $N_2O_4$ through a conduit 11 and is reacted with $H_2O$ in the dilute nitric acid supplied to the reactor 12 through a conduit 14. Thus, $HNO_3$ is produced according to a reaction represented by the formula, $$N_2O_4 + H_2O + \tfrac{1}{2} O_2 \rightarrow 2HNO_3 \qquad (1)$$

The nitric acid synthesis reactor 12 is a so-called gas sparged stirred tank type reactor made of stainless steel and has a stirrer 13 and a cooling coil 15 for removing heat of reaction. Heat of reaction transferred into cooling media may be, otherwise, heat-exchanged with an external recycle cooler. The concentration of the resulting nitric acid depends upon the concentration of the feed dilute nitric acid, the $N_2O_4$ concentration of the liquid phase in the synthesis reactor, the partial pressure of oxygen in the synthesis gas phase and the temperature, pressure and time of the reaction. If the feed dilute nitric acid is of a concentration of 60–70% by weight and the oxygen source used is air, concentrated nitric acid of a 80–90% by weight concentration can be easily produced at a pressure of 3 to 10 atomspheres and a temperature of 20° to 70° C. It is usually advantageous for commercial production to use a dilute nitric acid having a concentration of about 60–70% by weight as a starting material although there is no particular limitation to the concentration of the feed dilute nitric acid.

As the synthesized nitric acid contains a large amount of $N_2O_4$ dissolved, it is charged to the $N_2O_4$ stripping tower 6 at top thereof through a conduit 9 and is subjected to the $N_2O_4$ stripping treatment with the feed air together with the fuming nitric acid supplied through the conduit 5. As a result, substantially colorless nitric acid of an 80–90% by weight concentration is recovered through a conduit 10. A part of the resulting nitric acid is recycled to the $N_2O_4$ absorption tower 2 through the conduit 4 to be used as an absorbent for $N_2O_4$ and the remainder of the acid is withdrawn as a product through the conduit 10. The product may be used for various purposes as such or after further concentration by distillation.

The exhaust gas from the nitric acid synthesis reactor 12 is led to the exhaust gas scrubber 17 at its bottom through a conduit 16. The scrubber 17 is a stainless steel tower having perforated plates and a cooling coil 19. Unreacted $N_2O_4$ entrained in the exhaust gas is absorbed in the feed dilute nitric acid for the synthesis of concentrated nitric acid supplied to the top of the scrubber through a conduit 18, and is then recycled to the nitric acid synthesis reactor 12 through the conduit 14. The operating conditions in the exhaust gas scrubber 17 are a pressure of 3 to 10 atmospheres and a temperature of 0° to 40° C. Thus, 80 to 90% of $N_2O_4$ entrained in the air which pass through the nitric acid synthesis reactor is absorbed in the feed dilute nitric acid.

The unabsorbed gas from the exhaust gas scrubber 17 still contains a small amount of $N_2O_4$. Therefore, the unabsorbed gas is charged to the $N_2O_4$ absorption tower 2 through the conduit 20 to recover the unabsorbed $N_2O_4$.

As described above, in the present invention, absorption and stripping of $N_2O_4$ are carried out under the same pressure. Therefore, a consumption of power required for the recycle of the absorbent may be small. Additionally it is possible to utilize rather waste heat of low temperature level as the heat source for the stripping of $N_2O_4$ because the stripping of $N_2O_4$ is carried out in the presence of the feed air and thus the stripping temperature can be reduced.

The synthesis of $HNO_3$ is also carried out at almost the same pressure as in the stripping of $N_2O_4$. Therefore, the stripped $N_2O_4$ may be charged to the synthesis reactor as such together with the feed air. Thus, complicated equipments and operations such as the supplement of isolated $N_2O_4$ to the reaction system by a pump or compressor as in prior art processes may be omitted.

The washing of the exhaust gas is also carried out at substantially the same pressure as in the absorption of $N_2O_4$ and the synthesis of nitric acid. Therefore, the reabsorption of unrecovered $N_2O_4$ in the feed dilute nitric acid and the transfer of said dilute nitric acid containing $N_2O_4$ to the nitric acid synthesis reactor may be carried out without any additional equipment such as a pump or a compressor. Further, it is unnecessary to regenerate or supplement the absorbent and both equipments and operations are very simple since a part of the nitric acid produced in the synthesis reactor may be used as the absorbent for $N_2O_4$.

Thus, the present invention has a great advantage in that equipments and operations can be simplified; power consumption can be curtailed; and waste heat can be effectively utilized by rational utilization and combination of starting materials and apparatuses.

The following example illustrates but does not limit the scope of the present invention.

EXAMPLE

Concentrated nitric acid of a 85% by weight was produced under such conditions (flow rate, temperature, pressure, nitric acid concentration, composition, etc.) as shown in Table 1 according to the process flowsheet of FIG. 1 attached hereto.

TABLE 1

| Symbol number | Flow rate, kg.-mole/hr. | Kg./hr. | Temperature (°C.) | Pressure kg./cm.² (G) | NO | NO₂ | N₂O₄ | O₂ | N₂ | H₂O | HNO₃ | Unit of percentage |
|---|---|---|---|---|---|---|---|---|---|---|---|---|
| 1 | 11.59 | | 25 | 6.0 | 5.5 | a6.1 | | 3.4 | 85.0 | | | Mole percent. |
| 8 | 3.10 | | 60 | 6.5 | | | | 21.0 | 79.0 | | | Do. |
| 20 | 2.90 | | 25 | 6.0 | | a4.3 | | 11.2 | 84.5 | | | Do. |
| 21 | 10.72 | | 15 | 5.7 | | a0.2 | | 2.5 | 97.3 | | | Do. |
| 4 | | 405 | 10 | | | | 0.3 | | | 15.0 | 84.7 | Weight percent. |
| 5 | | 472 | 20 | | | | 14.5 | | | 12.8 | 72.7 | Do. |
| 9 | | 270 | 50 | | | | 25.1 | | | 11.3 | 63.6 | Do. |
| 10 | | 203 | 25 | | | | 0.3 | | | 15.0 | 84.7 | Do. |
| 18 | | 132 | 25 | | | | | | | 32.0 | 68.0 | Do. | a Represented as $NO_2$ although is a mixture of $NO_2 + N_2O_2$ in fact.

What is claimed is:

1. A method for producing concentrated nitric acid comprising the steps of (1) reacting dilute nitric acid, nitrogen peroxide and air at a pressure of 3 to 10 atmospheres and a temperature of 20° to 70° C. to produce a concentrated nitric acid of a 80—90% weight concentration containing nitrogen peroxide, (2) allowing nitrogen peroxide-containing gas to be absorbed in product concentrated nitric acid of a 80–90% by weight concentration to obtain nitrogen peroxide-containing nitric acid, (3) introducing said concentrated nitric acid of a 80—90% by weight concentration and said nitrogen peroxide-containing nitric acid into a stripping step under pressure to strip nitrogen peroxide by contacting countercurrently with the feed air and (4) allowing the gaseous nitrogen peroxide withdrawn from the nitric acid synthesis step (1) to be absorbed in the feed dilute nitric acid at an exhaust gas scrubber, characterized in that a part of the product obtained in the stripping step (3) is recycled to the nitrogen peroxide absorption step (2) to be used as said nitric acid for absorbing nitrogen peroxide while the remainder of the product is withdrawn as concentrated nitric acid of a 80–90% by weight concentration and that the nitrogen peroxide-containing air withdrawn from the stripping step (3) and the nitrogen peroxide-containing dilute nitric acid obtained in the exhaust gas scrubbing step (4) are introduced into the nitric acid synthesis step (1).

2. A method according to claim 1, wherein the unabsorbed gas from said exhaust gas scrubber is introduced into the nitrogen peroxide absorption step and nitrogen monoxide contained in the nitrogen oxides-containing gas is oxidized into nitrogen peroxide with oxygen contained in said unabsorbed gas.

3. A method according to claim 1, wherein said nitrogen peroxide- containing gas used is produced by oxidizing ammonia with air.

4. A method according to claim 1, wherein said dilute nitric acid is of a concentration of 60–70% by weight.

5. A method according to claim 1, wherein the absorption of nitrogen peroxide is operated at a pressure of from 3 to 10 atmospheres and at a temperature of from $-20°$ to $50°$ C.

6. A method according to claim 1, wherein the stripping of nitrogen peroxide is operated at a pressure of from 3 to 10 atmospheres and at a temperature of from $30°$ to $100°$ C.

7. A method according to claim 1, wherein said exhaust gas scrubber are maintained at a pressure of from 3 to 10 atmospheres and at a temperature of from $0°$ to $40°$ C.

References Cited

UNITED STATES PATENTS

| | | | |
|---|---|---|---|
| 3,542,510 | 11/1970 | Newman et al. | 23—160 R |
| 3,634,031 | 1/1972 | Hellmer et al. | 23—160 R |
| 2,028,402 | 1/1936 | Luscher | 23—160 R |

GEORGE O. PETERS, Primary Examiner

U.S. Cl. X.R.

423—394